May 26, 1959     R. G. PIETY     2,888,089
SEISMIC EXPLORATION
Filed Sept. 27, 1956     4 Sheets-Sheet 1

INVENTOR.
R.G. PIETY
BY Hudson & Young
ATTORNEYS

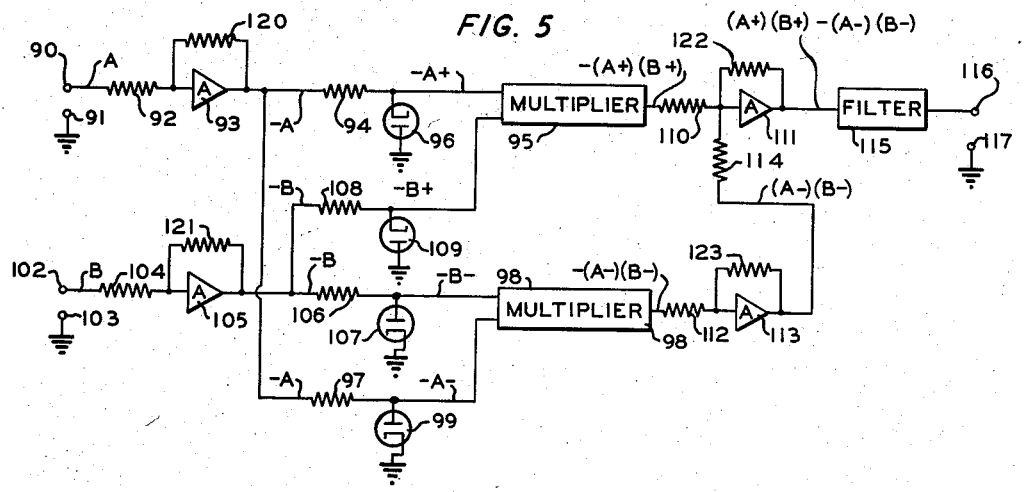
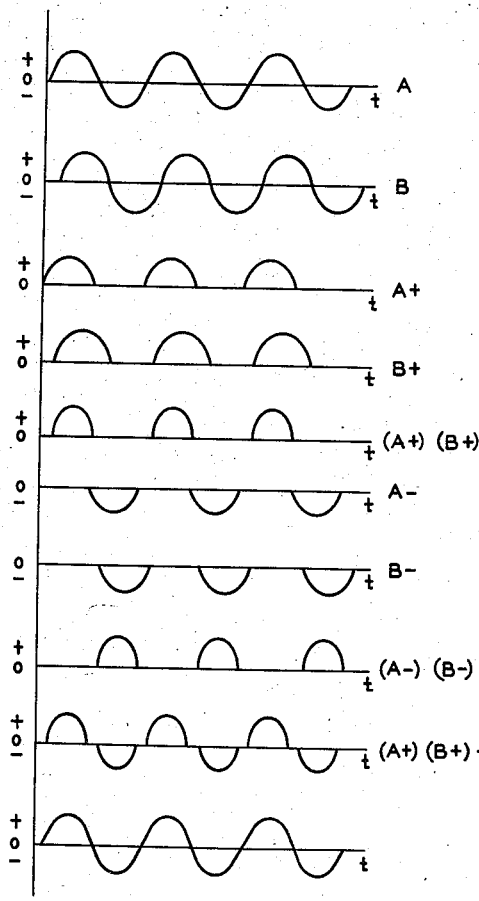
FIG. 4
INVENTOR.
R.G. PIETY
BY Hudson & Young
ATTORNEYS

INVENTOR.
R. G. PIETY
BY Hudson & Young
ATTORNEYS

United States Patent Office 2,888,089
Patented May 26, 1959

2,888,089

SEISMIC EXPLORATION

Raymond G. Piety, Bartlesville, Okla., assignor to Phillips Petroleum Company, a corporation of Delaware Application September 27, 1956, Serial No. 612,468

6 Claims. (Cl. 181—.5)

This invention relates to seismic exploration and to the interpretation of seismic signals.

Seismic exploration refers to a method of obtaining information regarding subterranean earth formations by transmitting vibrations from a first point at or near the surface of the earth downwardly into the formations and measuring the reflected or refracted vibrations at one or more second points spaced from the first point. It is common practice to detonate an explosive charge to produce the vibrations. A plurality of seismometers are disposed in a predetermined geometric array in spaced relationship from the shot holes. The vibrations incident upon the seismometers are converted into corresponding electrical signals which are amplified and recorded. By noting the relative arrival times of selected reflected vibrations in a plurality of records, it is possible to obtain valuable information regarding the depth and slope of subterranean reflecting beds. However, extraneous vibrations usually are present in the recorded records which tend to obscure the recognition of the desired reflected signals. In order to minimize these extraneous vibrations, a number of systems have been proposed which include electrical tuning networks and the combination of signals received from a plurality of seismometers. However, there are still large areas where it is impossible to obtain accurate information by seismic exploration because of the noise vibrations.

The present invention relates to an improved method of seismic exploration wherein the seismic records are transformed in a manner so that common reflections in a plurality of records are readily identifiable. This method involves establishing two electrical signals which are representative of the reflections received by at least two seismometers. The two signals are rectified so that the positive and negative portions of both are separated. The positive portions of the two signals are multiplied by one another and the negative portions of the two signals are multiplied by one another. The product of the negative portions of the two signals is subtracted from the product of the positive portions of the two signals to obtain a transformed signal. This signal preferably is filtered to provide a smooth output signal. It has been found that seismic signals transformed in accordance with this method provide a record which permits identification of desired reflections even in the presence of a large amount of random noise vibrations.

Accordingly, it is an object of this invention to provide a method of and apparatus for transforming seismic signals so that reflections from common subterranean formations are readily identifiable in a plurality of records.

Another object is to provide a method of seismic exploration which permits reflected vibrations to be identified in the presence of random noise vibrations.

Other objects, advantages and features of this invention should become apparent from the following detailed description which is taken in conjunction with the accompanying drawings in which:

Figure 4 is a graphical representation of the rectification, multiplication and subtraction steps of the method of this invention.

Figure 5 is a schematic circuit drawing of the computing apparatus of this invention.

Figure 1:
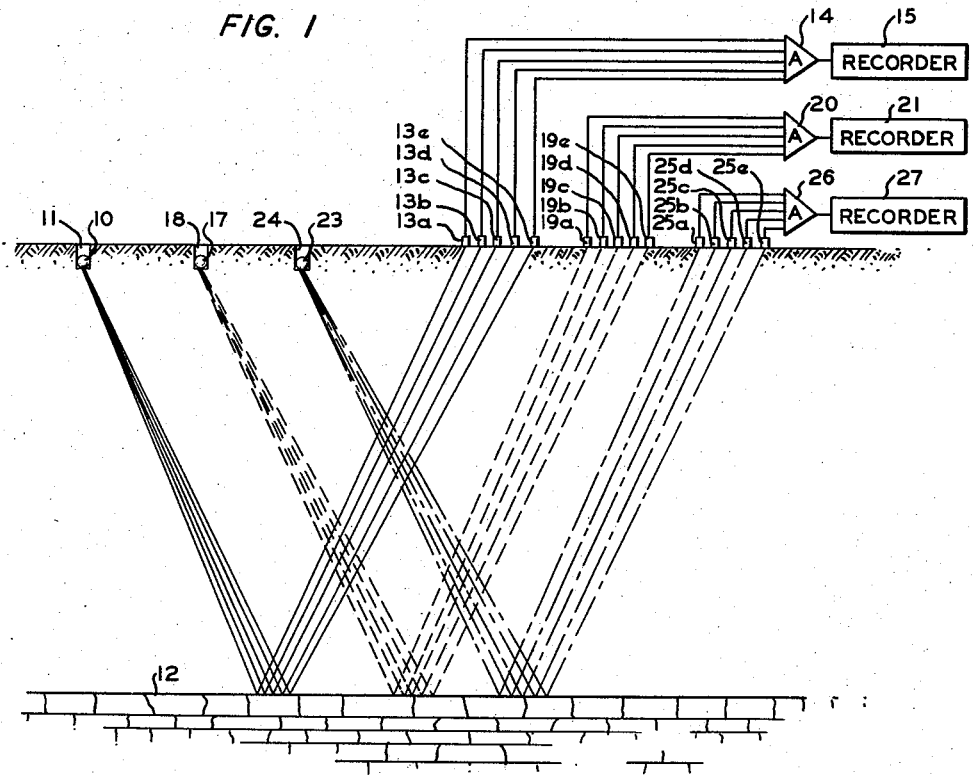
Figure 1 is a schematic representation of a seismic exploration procedure which can be employed to carry out the method of this invention.

Referring now to the drawing in detail and to Figure 1 in particular, there is shown a seismic exploration system. A first explosive charge 10 is detonated in a shot hole 11. Vibrations emitted from this explosive charge are reflected from a subterranean formation 12 and are received by a plurality of seismometers 13a, 13b, 13c, 13d, and 13e which are spaced from one another and from shot hole 11. The output signals from these five seismometers are combined by a summing amplifier 14 and applied to a recorder 15. A second explosive charge 17 is subsequently detonated in a shot hole 18 which is spaced from shot hole 11. Vibrations emitted from explosive charge 17 are reflected by formation 12 and received by a plurality of second seismometers 19a, 19b, 19c, 19d, and 19e which are spaced from shot hole 18 and from the first set of seismometers. The signals received by this second group of seismometers are combined by summing amplifier 20 and applied to a recorder 21. A third explosive charge 23 is then detonated in a shot hole 24 which is spaced from shot hole 18. The vibrations emitted from this explosive charge are reflected from the formation 12 and received at a plurality of third seismometers 25a, 25b, 25c, 25d, and 25e which are spaced from shot hole 24 and from the second group of seismometers. The signals received by this third group of seismometers are combined by a summing amplifier 26 and applied to a recorder 27.

In the method illustrated in Figure 1, it is desirable that the shot holes be spaced equidistant from one another along a common line. The groups of seismometers are similarly spaced from one another along the same line. This procedure simplifies the record combining processes of this invention, but is not essential, as is pointed out hereinafter in detail. The procedure described in conjunction with Figure 1 is repeated with explosive charges being detonated in sequence in a series of shot holes spaced from shot hole 24. This invention will be described in conjunction with only three explosive charges in order to simplify the explanation and the drawing. However, in actual practice, a larger number of signals normally are obtained and combined.

Figure 2:
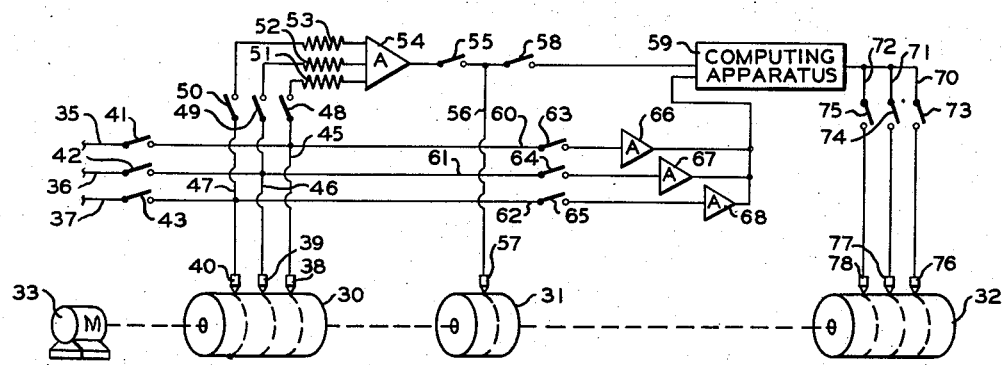
Figure 2 is a schematic view of the recording and computing apparatus employed to carry out this invention.

The recording and computing apparatus of this invention is illustrated schematically in Figure 2. It is desirable that the seismic signals be recorded initially on a magnetic tape because such a procedure enables the records to be manipulated readily. The recording apparatus of Figure 2 comprises drums 30, 31, and 32 which have magnetic tapes thereon and which are rotated by a motor 33. Although separate drums have been shown in the drawing, it should be evident that a single drum with a larger number of channels can be employed. The output signal from amplifiers 14, 20, and 26 of Figure 1 are connected by conductors 35, 36, and 37, respectively, to respective recording heads 38, 39, and 40 adjacent drum 30. Conductors 35, 36, and 37 have switches 41, 42, and 43, respectively, therein. The output signals of the three summing amplifiers 41 are thus recorded initially on drum 30. In order to simplify the drawings, single conductors are illustrated. It should be evident that two conductors, or one conductor and ground, actually are employed.

In accordance with a present preferred embodiment of this invention, it is desired that these three signals be summed to provide a composite record. Recording heads 38, 39, and 40 are connected by respective conductors 45, 46, and 47, which have respective switches 48, 49, and 50 therein, through respective isolating resistors 51, 52, and 53 to the inputs of a summing amplifier 54. The output of amplifier 54 is connected through a switch 55 and a conductor 56 to a recording head 57 adjacent drum 31. After the initial signals are recorded on drum 30, switches 41, 42, and 43 are opened and switches 48, 49, and 50 are closed. Drum 30 is rotated past heads 38, 39, and 40 which then function as reproducing heads so that the initial recorded signals are summed and recorded on drum 31. Switch 55 is closed at this time. The signal recorded on drum 31 is then combined with the individual signals originally recorded on drum 30 in accordance with the procedure of this invention. Head 57 of drum 31 is connected through conductor 56 and a switch 58 to the first input terminal of computing apparatus 59. Heads 38, 39, and 40 of drum 30 are connected by respective conductors 60, 61, and 62, which have respective switches 63, 64, and 65 therein, to the inputs of amplifiers 66, 67, and 68 respectively. The outputs of these amplifiers are connected to the second input of computing apparatus 59. The output of computing apparatus 59 is connected by conductors 70, 71, and 72, which have respective switches 73, 74, and 75 therein, to respective recording heads 76, 77, and 78 of drum 32.

Figure 3:
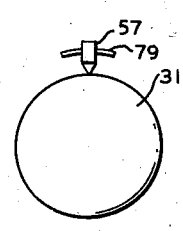
Figure 3 is an end view of one of the recording drums of Figure 2.

The recording heads of drums 30 and 31 are adjustably mounted so that the signals originally recorded can be reproduced with selected time delays. This is illustrated schematically in Figure 3 where recording head 57 is shown attached to a curved support member 79 adjacent drum 31.

The method of this invention can be explained in conjunction with Figure 4. The several curves shown in Figure 4 represent electrical signals that correspond to the recorded and transformed seismic signals. Curve A represents the signal originally recorded on drum 31, for example. Curve B represents the signal originally recorded by head 38 on drum 30, for example. The two signals are rectified to provide the signals represented by the curves A+ and B+, respectively. These latter signals are multiplied to obtain the product (A+)(B+). Curves A and B are also rectified so as to obtain signals represented by the two negative curves A— and B—. These latter signals are multiplied to obtain the product (A—)(B—). This second product is then subtracted from the first product to obtain the quantity $$(A+)(B+) - (A-)(B-)$$

The resulting signal is filtered to provide a smooth output signal as represented by the lowermost curve of Figure 4. As will become evident hereinafter, this process, when repeated, results in a series of transformed signals wherein common vibrations are readily identifiable.

The apparatus illustrated in Figure 5 is provided to carry out the rectification, multiplication and subtraction steps illustrated in Figure 4. This computing apparatus is provided with first and second input terminals 90 and 91, the latter being grounded. Terminal 90 is connected through a resistor 92 to the first input of an amplifier 93. The output of amplifier 93 is connected through a resistor 94 to the first input of a multiplier circuit 95. A rectifier 96 is connected between the first input of multiplier circuit 95 and ground. The output of amplifier 93 is also connected through a resistor 97 to the first input of a second multiplier circuit 98. A rectifier 99 is connected between the first input of multiplier circuit 98 and ground. The computing apparatus is also provided with second input terminals 102 and 103, the latter being grounded. Terminal 102 is connected through a resistor 104 to the input of an amplifier 105. The output of amplifier 105 is connected through a resistor 106 to the second input of multiplier circuit 98. A rectifier 107 is connected between the second input of multiplier circuit 98 and ground. The output of amplifier 105 is also connected through a resistor 108 to the second input of multiplier circuit 95. A rectifier 109 is connected between the second input of multiplier circuit 95 and ground. The output of multiplier circuit 95 is connected through a resistor 110 to the input of a summing amplifier 111. The output of multiplier circuit 98 is connected through a resistor 112 to the input of an amplifier 113. The output of amplifier 113 is connected through a resistor 114 to the input of amplifier 111. The output of amplifier 111 is connected through a filter 115 to a first output terminal 116. The second output terminal 117 is connected to ground.

The amplifiers 93, 105, 111, and 113 can be conventional high gain electronic amplifiers which preferably are provided with degenerative feedback resistors 120, 121, 122, 123, respectively, to minimize distortion. In the illustrated embodiment of Figure 5, the output signals of these amplifiers are 180° out of phase with the corresponding input signals, as is provided with an odd number of vacuum tube amplifier stages. It should be observed that rectifiers 96 and 109 are connected with corresponding first polarities and that rectifiers 99 and 107 are connected with corresponding second polarities. It is assumed that the signals A and B of Figure 4 are applied to the respective inputs of the circuit of Figure 5. The output signals of amplifiers 93 and 95 are thus representative of —A and —B, respectively. The rectifiers 96 and 109 permit passage of only the positive portions of these signals, whereas rectifiers 107 and 99 permit passage of only the negative portions of these signals. Multiplier circuits 95 and 98 can be of the type described in Electronics, August 1956, page 182, for example. The circuits provide output signals which are representative of the products of the two input signals applied thereto. Amplifier 113 reverses the phase of the output of multiplier circuit 98 so that summing amplifier 111 performs the indicated subtraction. The several amplifiers are employed to provide sufficient gain to enable the signals to pass through the multipliers and filter.

Figure 6:
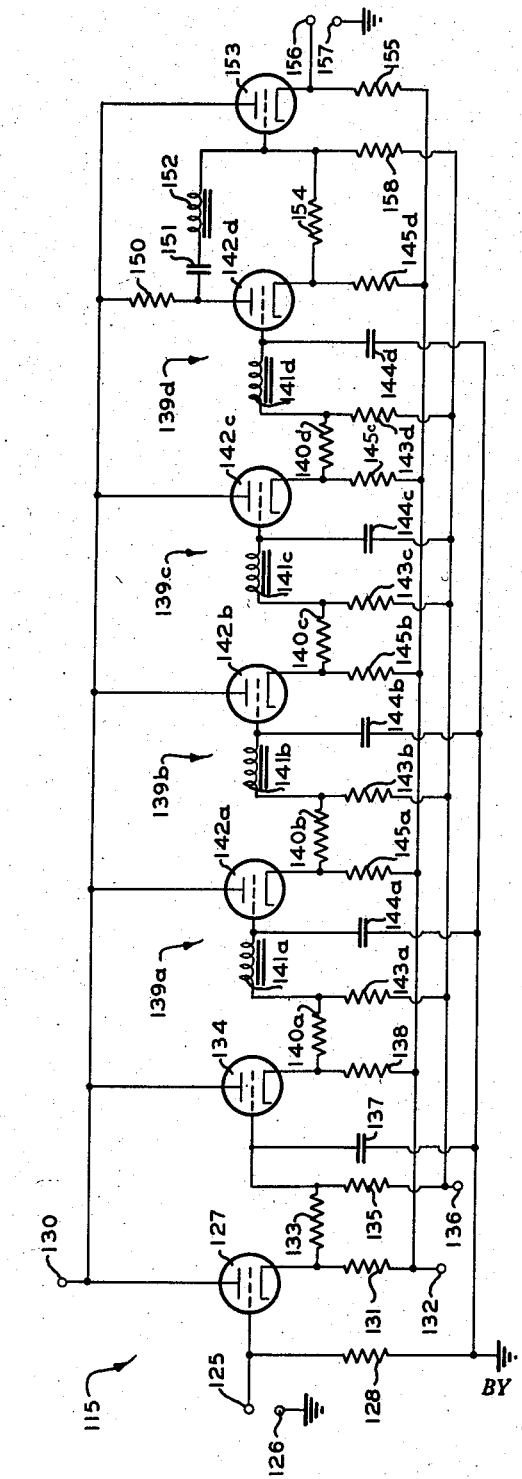
Figure 6 is a schematic circuit drawing of the interpolation filter of Figure 5.

A suitable circuit for use as filter 115 is illustrated in Figure 6. The first input terminals 125 of this circuit is connected to the control grid of a triode 127. The second input terminals 126 is connected to ground. Terminal 125 is also connected to ground through a resistor 128. The anode of triode 127 is connected to a positive potential terminal 130, and the cathode of triode 127 is connected through a resistor 131 to a negative potential terminal 132. The cathode of triode 127 is connected through a resistor 133 to the control grid of a triode 134. The control grid of triode 134 is connected through a resistor 135 to a negative potential terminal 136 and to ground through a capacitor 137. The anode of triode 134 is connected to terminal 130, and the cathode of triode 134 is connected through a resistor 138 to terminal 132.

Four identical filter networks 139a, 139b, 139c, and 139d are connected in series relationship with one another to the output of triode 134. Network 139a comprises a resistor 140a and an inductor 141a which are connected in series relationship between the cathode of triode 134 and the control grid of a triode 142a. The junction between resistor 140a and inductor 141a is connected through a resistor 143a to terminal 136. The control grid of triode 142a is connected to ground through a capacitor 144a. The anode of triode 142a is connected to terminal 130, and the cathode of triode 142a is connected through a resistor 145a to terminal 132. Filter networks 139b, 139c and 139d are identical to network 139a.

The anode of triode 142d is connected through a resistor 150 to terminal 130. The anode of triode 142d is also connected through a capacitor 151 and an inductor 152 to the control grid of a triode 153. The cathode of triode 142d is connected to the control grid of triode 153 through a resistor 154. The control grid of triode 153 is connected through a resistor 158 to terminal 136. The anode of triode 153 is connected to terminal 130, and the cathode of triode 153 is connected through a resistor 155 to terminal 132. The cathode of triode 153 is connected to the first output terminal 156 of the filter network. The second output terminal 157 is connected to ground.

The filter network illustrated in Figure 6 has a normal density function response. If a single input pulse is applied between terminals 125 and 126, the output signal between terminals 156 and 157 represents the normal density curve, which is defined by the general expression:

$$E_0(t) = Ke^{-(xt)^2}$$

where $E_0(t)$ is the output voltage as a function of time, $K$ is a constant relating to the energy loss through the filter, $t$ is time, $e$ is the base of natural logarithms, and $x$ is a constant relating to the width of the density curve. This filter is particularly effective in smoothing the output signal of amplifier 111 in order to provide a continuous signal, such as shown in the lowermost curve of Figure 4.

In one specific embodiment of filter 115, the following circuit components were employed:

| Resistor: | Ohms |
|---|---|
| 131 | 5,600 |
| 138 | 5,600 |
| 145a | 5,600 |
| 145b | 5,600 |
| 145c | 5,600 |
| 145d | 5,600 |
| 155 | 5,600 |
| 128 | 470,000 |
| 133 | 1,000,000 |
| 135 | 8,200,000 |
| 143a | 8,200,000 |
| 143b | 8,200,000 |
| 143c | 8,200,000 |
| 143d | 8,200,000 |
| 158 | 8,200,000 |
| 140a | 180,000 |
| 140b | 180,000 |
| 140c | 180,000 |
| 140d | 180,000 |
| 154 | 180,000 |
| 150 | 5,600 |

| Capacitor: | Microfarads |
|---|---|
| 137 | 0.05 |
| 144a | 0.031 |
| 144b | 0.015 |
| 144c | 0.0076 |
| 144d | 0.0047 |
| 151 | 0.003 |

| Inductor: | Henries |
|---|---|
| 141a | 500 |
| 141b | 500 |
| 141c | 500 |
| 141d | 500 |
| 152 | 500 |

| Terminal: | Volts |
|---|---|
| 130 | +150 |
| 132 | −12 |
| 136 | −90 |

| Triodes: | Type |
|---|---|
| All | ½ 12AT7 |

In one specific embodiment of this invention, a series of eleven explosive charges were detonated in sequence in shot holes along a common line spaced approximately 300 feet from one another. Vibrations from each of these explosive charges were received by a total of eight seismometers which had their outputs summed by an amplifier, such as 14 in Figure 1 of the drawing. The eleven recorded signals contained considerable amounts of extraneous noise vibrations, as illustrated by respective curves 160 to 170 of Figure 7a which are reproductions of photographic traces made of original recordings made in the Texas Panhandle. It can be seen that corresponding reflections are difficult, if not impossible, to identify in the eleven curves. These eleven signals were then summed to provide a single composite record, such as is illustrated by drum 31 of Figure 2. Each initial signal was then multiplied by the composite curve in the manner of this invention using the apparatus of Figure 5 so as to obtain the curves 160' to 170' which are shown in Figure 7b. The curves of Figure 7b are reproductions of photographic recordings of the final transformed records. It should be evident from an inspection of the curves of Figure 7b that the common reflections on the several curves are readily identifiable. The random noise vibrations are greatly reduced.

In order to simplify the explanation of the invention, it has been assumed that the several seismometer signals were obtained from vibrations of substantially equal travel paths. This invention is not restricted to such an exploration procedure, however. Signals representative of different lengths of travel paths can be combined by incorporating suitable delays at the time of the combination to compensate for different path angularities. This can readily be accomplished by the adjustable recording and reproducing heads associated with the magnetic tape drums. Furthermore, it is usually necessary to compensate for differences in elevation and thicknesses of the weathered layer. This can also be accomplished by incorporating suitable delays in the original combination of records, as is well known by those skilled in the art. In the system illustrated in Figure 1, it is assumed that the seismometers associated with each amplifier are sufficiently close together that no corrections are needed for angularity of path. However, corrections can be made if the seismometers are spaced sufficiently far from one another to require such corrections.

While the invention has been described in conjunction with multiplying individual signals by the sum of a plurality of signals, such a procedure is not necessary. A first signal can be multiplied directly by a second to provide useful information in some situations.

Figure 7A:
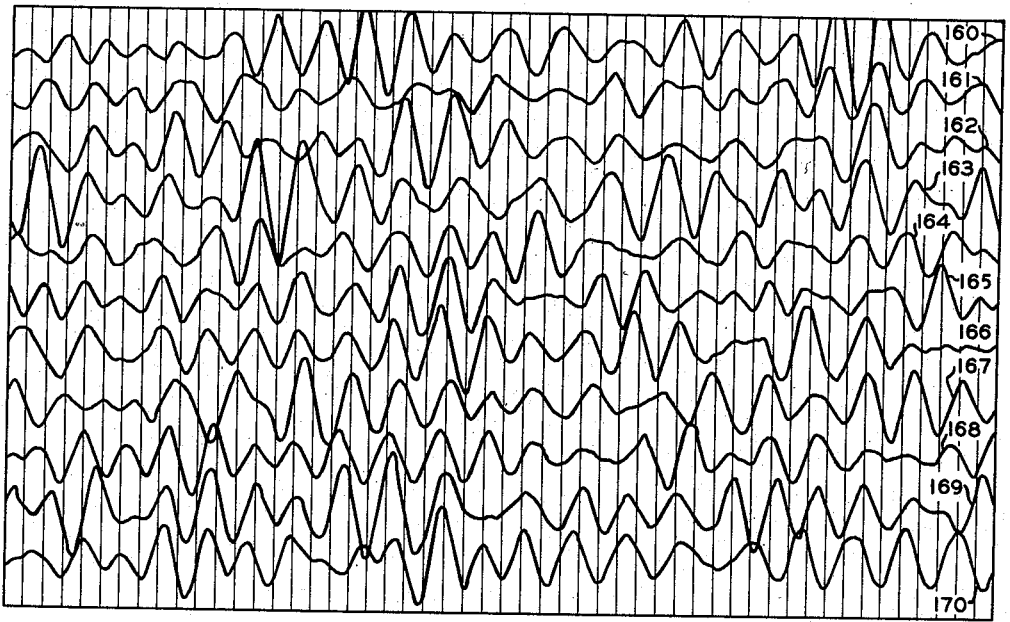
Figures 7a and 7b are graphical representations of original seismic signals and transformed signals obtained by the method of this invention, respectively.
Figure 7B:
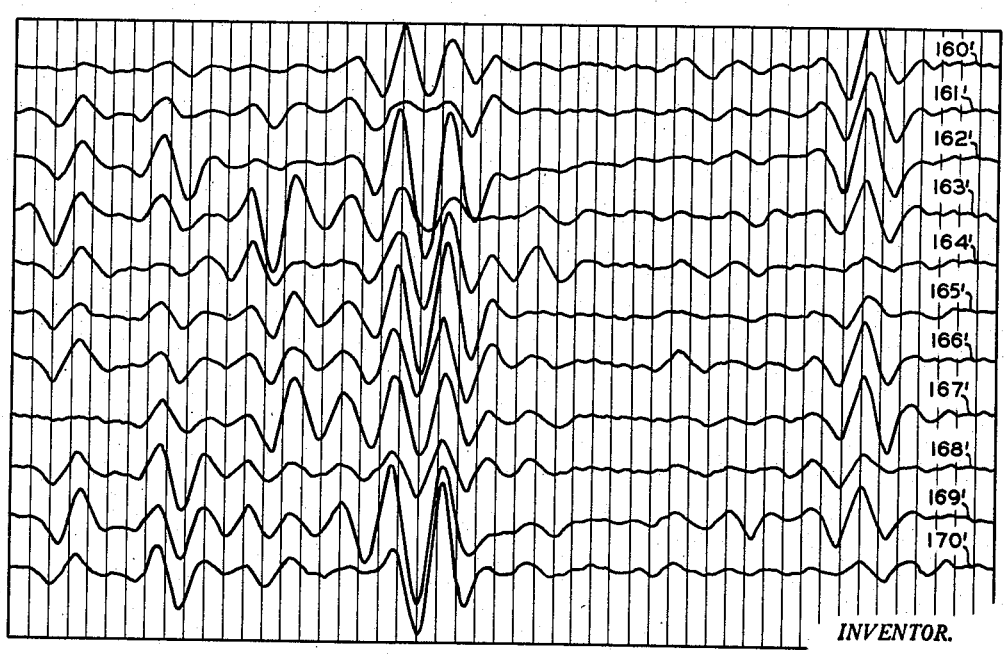

From an inspection of the curves of Figures 7a and 7b, it should be evident that the method of this invention greatly reduces the amount of extraneous noise in seismic signals so that common reflections can readily be identified. While the invention has been described in conjunction with present preferred embodiments, it should be evident that it is not limited thereto.

What is claimed is:

1. Seismic signal transforming apparatus comprising means to establish a first electrical signal which varies in amplitude in accordance with vibrations received by a seismometer; means to establish a second electrical signal which varies in amplitude in accordance with vibrations received by a seismometer; means energized by said first signal to establish third and fourth signals which are representative of the positive and negative portions of said first signal, respectively, taken with respect to a reference zero voltage; means energized by said second signal to establish fifth and sixth signals which are representative of the positive and negative portions of said second signal, respectively, taken with respect to said reference zero voltage; means to multiply said third and fifth signals to establish a seventh signal; means to multiply said fourth and sixth signals to establish an eighth signal; and means to subtract said eighth signal from said seventh signal.

2. Seismic signal transforming apparatus comprising means to establish a first electrical signal which varies in amplitude in accordance with vibrations received by a seismometer; first rectifying means to remove the negative portions of said first signal, taken with respect to a zero reference voltage, thereby to form a second signal which is positive; second rectifying means to remove the positive portions of said first signal, taken with respect to said reference voltage, thereby to form a third signal which is negative; means to establish a fourth electrical signal which varies in amplitude in accordance with vibrations received by a seismometer; third rectifying means to remove the negative portions of said fourth signal, taken with respect to said zero reference voltage, thereby to form a fifth signal which is positive; fourth rectifying means to remove the positive portions of said fourth signal, taken with respect to said reference voltage, thereby to form a sixth signal which is negative; means to multiply said second signal by said fifth signal to form a seventh signal; means to multiply said third signal by said sixth signal to form an eighth signal; and means to subtract said eighth signal from said seventh signal.

3. Seismic signal transforming apparatus comprising means to establish a first electrical signal which varies in amplitude in accordance with vibrations received by a seismometer; first rectifying means to remove the negative portions of said first signal, taken with respect to a zero reference voltage, thereby to form a second signal which is positive; second rectifying means to remove the positive portions of said first signal, taken with respect to said reference voltage, thereby to form a third signal which is negative; means to establish a fourth electrical signal which varies in amplitude in accordance with vibrations received by a seismometer; third rectifying means to remove the negative portions of said fourth signal, taken with respect to said zero reference voltage, thereby to form a fifth signal which is positive; fourth rectifying means to remove the positive portions of said fourth signal, taken with respect to said reference voltage, thereby to form a sixth signal which is negative; means to multiply said second signal by said fifth signal to form a seventh signal; means to multiply said third signal by said sixth signal to form an eighth signal; means to subtract said eighth signal from said seventh signal to form a ninth signal; and filter means to convert said ninth signal into a smooth output signal.

4. Seismic signal transforming apparatus comprising first and second electrical signal multiplying means, first and second input terminals, first means connecting said first input terminal to the first input of said first multiplying means, first rectifying means connected between said first means and a reference potential so that voltages greater than a predetermined value are transmitted to the first input of said first multiplying means, second means connecting said second input terminal to the second input of said first multiplying means, second rectifying means connected between said second means and said reference potential so that voltages greater than a predetermined value are transmitted to the second input of said first multiplying means, third means connecting said first input terminal to the first input of said second multiplying means, third rectifying means connected between said third means and said reference potential so that voltages less than a predetermined value are transmitted to the first input of said second multiplying means, fourth means connected between said second input terminal and the second input of said second multiplying means, fourth rectifying means connected between said fourth means and said reference potential so that voltages less than a predetermined value are transmitted to the second input of said second multiplying means, and means to subtract the output signal of said second multiplying means from the output signal of said first multiplying means.

5. The apparatus of claim 4 wherein said means to subtract comprises a summing amplifier, phase reversal means connecting the output of said second multiplying means to an input of said summing amplifier, and means connecting the output of said first multiplying means to an input of said summing amplifier.

6. Seismic signal transforming apparatus comprising first and second electrical signal multiplying means, first and second input terminals, first means connecting said first input terminal to the first input of said first multiplying means, first rectifying means connected between said first means and a reference potential so that voltages greater than a predetermined value are transmitted to the first input of said first multiplying means, second means connecting said second input terminal to the second input of said first multiplying means, second rectifying means connected between said second means and said reference potential so that voltages greater than a predetermined value are transmitted to the second input of said first multiplying means, third means connecting said first input terminal to the first input of said second multiplying means, third rectifying means connected between said third means and said reference potential so that voltages less than a predetermined value are transmitted to the first input of said second multiplying means, fourth means connected between said second input terminal and the second input of said second multiplying means, fourth rectifying means connected between said fourth means and said reference potential so that voltages less than a predetermined value are transmitted to the second input of said second multiplying means, means to subtract the output signal of said second multiplying means from the output signal of said first multiplying means, and filter means connected to the output of said means to subtract, said filter means having a normal density function response to a unit input pulse.

References Cited in the file of this patent

UNITED STATES PATENTS 2,779,428     Silverman _____ Jan. 29, 1957